United States Patent [19]

Pekau et al.

[11] 4,002,906

[45] Jan. 11, 1977

[54] APPARATUS AND METHOD FOR THE RECORDING AND REPRODUCTION OF X-RAY PICTURES

[75] Inventors: Dietlind Pekau, Taufkirchen; Eckhard Storck, Munich, both of Germany

[73] Assignee: Siemens Aktiengesellschaft, Berlin & Munich, Germany

[22] Filed: July 23, 1975

[21] Appl. No.: 598,284

[30] Foreign Application Priority Data

July 31, 1974 Germany .......................... 2436894

[52] U.S. Cl. .......................................... 250/315 A

[51] Int. Cl.[2] .......................................... G03B 41/16

[58] Field of Search ........................ 250/315, 315 A

[56] References Cited

UNITED STATES PATENTS

| | | | |
|---|---|---|---|
| 2,825,814 | 3/1958 | Walkup | 250/315 A |
| 3,828,191 | 8/1974 | Eseke | 250/315 A |
| 3,914,609 | 10/1975 | Jeromin | 250/315 A |

FOREIGN PATENTS OR APPLICATIONS

| | | | |
|---|---|---|---|
| 1,497,093 | 8/1970 | Germany | 250/315 A |

*Primary Examiner*—Craig E. Church
*Attorney, Agent, or Firm*—Hill, Gross, Simpson, Van Santen, Steadman, Chiara & Simpson

[57] ABSTRACT

X-ray pictures are recorded and reproduced through techniques in which a housing, which contains a recording medium sensitive to X-rays is provided with an inlet window for the X-rays which consists of an electrode transparent for optical radiation. The housing is provided with an outlet window which is likewise transparent for optical radiation, and the recording medium is a thermoplastic layer which is arranged on an electrode also transparent for optical radiation on a similarly transparent substrate. The housing contains an inert gas at a pressure of at least 10 atmospheres.

11 Claims, 4 Drawing Figures

APPARATUS AND METHOD FOR THE RECORDING AND REPRODUCTION OF X-RAY PICTURES

BACKGROUND OF THE INVENTION

1. Field of the Invention

This invention relates to a method and apparatus for recording and reproducing X-ray pictures through the utilization of a housing which contains a recording medium which is sensitive to X-rays.

2. Description of the Prior Art

In order to improve the picture quality and the contrast in the recording of X-ray pictures, in comparison to conventional photographic plates, it is already known in the art to employ so-called "xeroradiography" techniques in which the X-rays strike a layer which has already been charged prior to the exposure and consisting of, for example, of amorphous selenium having a high dark resistance characteristic. In the selenium, the X-ray quanta produce high-speed photo electrons which, in turn, produce pairs of electron holes, resulting in a breakdown of charge. The layer is developed by being dusted with a cloud of powder, consisting, for example, of toner particles, whereupon the tone impage is transferred by an electric field to lined paper and is fixed by a heat treatment.

Another possibility consists in arranging this X-ray sensitive layer in a chamber which is filled with an inert gas under pressure, and then exposing the layer to the X-rays. In this case, the layer is not charged prior to the exposure with the X-rays, as in the inert gas process, for example, in xenon, the X-rays produce an ionization current so that each quantum releases a photoelectron giving rise to pairs of electrons-ions which build up a charge on a charge carrier layer. In order to develop the X-ray picture, the gas must now be eliminated from the chamber, the plate must be withdrawn, and then, similarly as in a "xerography" process, the plate must be dusted with a powder and fixed by heating. It will be clear from this complicated development process that only low picture rates can be achieved, and that there can be no question of a radioscopy process in the form of series investigations.

SUMMARY OF THE INVENTION

The object of the present invention is to provide an apparatus and method for the recording and reproduction of high contrast X-ray pictures with which high picture rates can be achieved, so that the device is also suitable for series investigations in radioscopy processes.

Starting with a recording medium which is arranged in a housing and which is sensitive to X-rays, this object is realized in that the housing is provided with an inlet window for the X-rays which consists of an electrode which is transparent for optical radiation. The housing is also provided with an outlet window which is also transparent for optical radiation. The recording medium is in the form of a thermoplastic layer, well known in the art per se, which layer is arranged on an electrode which is transparent to optical radiation and a likewise transparent substrate. Also, the housing contains an inert gas under a pressure of at least 10 atmospheres.

In another exemplary embodiment of the invention, a mobile corona charge electrode is additionally provided in the housing.

A Schlieren or phase contrast optical system, can be arranged at the rear of the outlet window.

It is particularly advantageous in practicing the invention for the inert gas to be xenon and contained at a pressure of 15 atmospheres in the housing.

A suitable process for the recording and reproduction of X-ray pictures consists of the following steps:

Connection of high voltage in the order of 1 kV to the inlet window which is in the form of a transparent electrode;

Irradiation of the X-rays to be recorded through the inlet window into the housing:

Ionization of the xenon contained in the housing, whereupon the ions, under the influence of the electric field, move toward the thermoplastic layer and produce a charge distribution on its free surface;

Connection of a voltage between the housing electrode and the thermoplastic electrode so that during the subsequent heating step the thermoplastic lies in an electric field of approximately 100 V/$\mu$;

Heating the thermoplastic layer until a surface relief corresponding to the charge distribution is formed;

Cooling the thermoplastic layer and thus fixing the relief therein formed by the step of heating; and Irradiating with optical radiation into the housing through the inlet window, wherein the radiation passes through the thermoplastic layer, emerges through the outlet window and passes through a Shclieren or phase contrast optical system as a result of which the phase modulation of the optical radiation is transformed into an amplitude modulation.

Visualization of the X-ray picture stored in the thermoplastic layer on a suitable screen, and erasure of the picture by heating of the thermoplastic layer are additional steps which may be practiced in this process.

BRIEF DESCRIPTION OF THE DRAWINGS

Other objects, features and advantages of the invention, its organization, construction and operation will be best understood from the following detailed description taken in conjunction with the accompanying drawings, on which.

DESCRIPTION OF THE PREFERRED EMBODIMENTS

Figure 1:
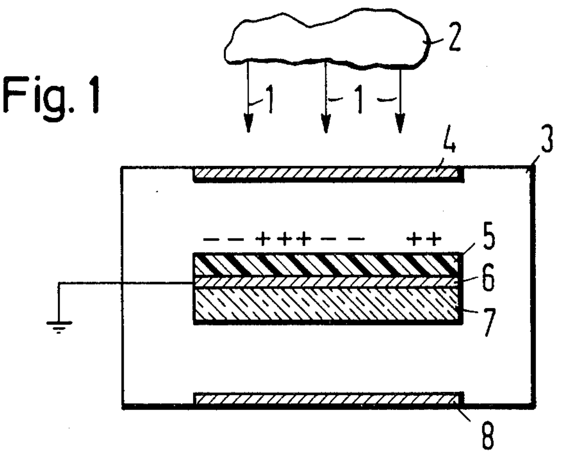
FIG. 1 is an elevational sectional view through a device constructed in accordance with the invention.

Turning to FIG. 1, a schematic illustration of an embodiment of the invention is illustrated in which X-rays 1, which are to be recorded, have passed through an object 2. A housing 3 is filled with an inert gas under pressure, for example, the housing 3 is filled with a xenon at a pressure of 15 atmospheres. The housing 3 is provided at its input end with an inlet window 4 which is in the form of an electrode which is transparent for optical radiation. A thermoplastic layer 5 which is a few $\mu$ thick is arranged on a transparent, heatable electrode 6, which itself is arranged on a substrate 7, for example glass, which is also transparent to optical radiation. An outlet window 8 is provided in the housing 3. A high voltage of approximately 1 kV is connected between the transparent electrode 4 and the transparent, heatable electrode 6, as a result of which the ionization currents produced in xenon by the incoming X-rays move along the electric field lines between the electrodes and produce a charge distribution on the free surface of the thermoplastic layer 5.

Figure 2:
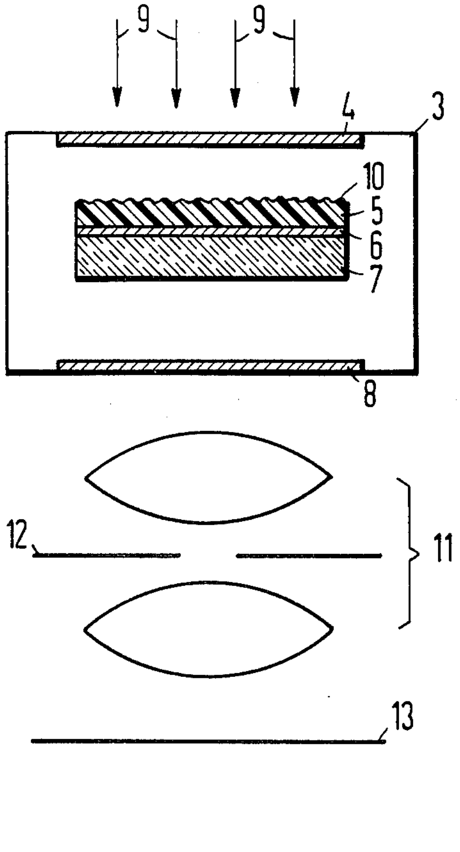
FIG. 2 is an elevational sectional view through a device constructed in accordance with the invention, and more specifically FIG. 2 schematically illustrates a device for reading out a X-ray picture.

Following the exposure, the surface relief in the thermoplastic layer 5 is developed in a manner known per se by heating the layer 5 by means of a heatable electrode 6. In order to increase the sensitivity of the process, during the heating of the thermoplastic layer 5, the electrode 4 can be connected to a high voltage so that the thermoplastic film is located in a field of approximately 100 V/μ. By subsequent cooling, the picture is fixed and, as schematically illustrated in FIG. 2, can be optically read out. For this purpose, a laser beam or other collimated, incoherent light beam is directed through the inlet window 4 onto the phase relief 10 which is formed in proportion to the X-ray intensity. The light beam passes through the thermoplastic layer 5, the electrode 6, and the substrate 7 and emerges from the housing 3 through the outlet window 8, whereupon the phase modulation of the light beam is converted by a Schlieren or phase contrast optical system 11 which comprises a filter 12, into an amplitude distribution which can be visualized on a suitable screen 13.

The read-out beam can also be irradiated through the outlet window 8 and reflected by the phase relief 10.

Figure 3:
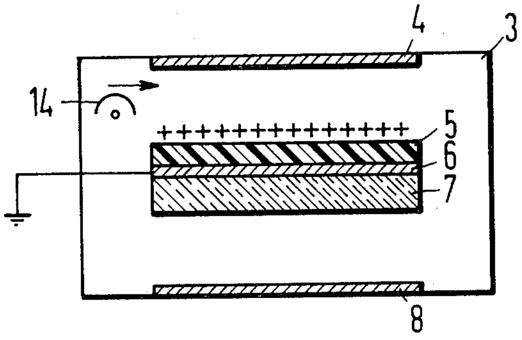
FIG. 3 is an elevational sectional view of another exemplary embodiment of the invention.
Figure 4:
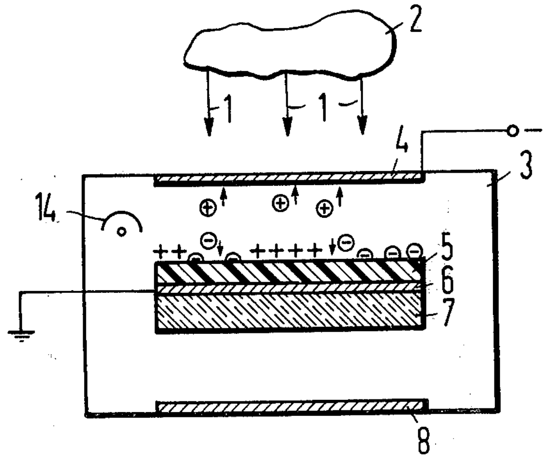
FIG. 4 is a schematic illustration of the embodiment of the invention illustrated in FIG. 3 and further showing the application of controlling influences in the production and reproduction of X-ray pictures.

FIG. 3 illustrates another exemplary embodiment of the invention in which identical parts have been given the same reference numerals. In this embodiment, the housing 3 additionally contains a mobile corona charge electrode 14 with which a uniformly distributed surface charge can be imparted to the free surface of the thermoplastic layer 5 prior to the exposure. Then, as schematically illustrated in FIG. 4, the thermoplastic layer 5 is exposed by the X-rays 1, which themselves produce ionization currents in the housing. In the case of a reverse polarity of the voltage connected to the electrodes 4 and 6, the thermoplastic layer 5 is discharged in proportion to the X-ray intensity. After exposure, the surface charge distribution which prevails on the thermoplastic layer 5 is developed in a known manner by heating and is fixed by cooling.

In response to the X-ray radiation normally used, for example for radioscopy, charges of $10^{-9}$ coulomb/cm$^2$ per mR, are formed on the surface of the thermoplastic layer 5, electric field strengths of 100 V/μ being necessary for the deformation of the thermoplastic. Therefore, approximately 200 mR would be required to deform the thermoplastic layer by direct charge. In order to substantially increase the sensitivity, during the development of the thermoplastic film, an electric field of approximately 100 V/μ is connected between the electrodes 4 and 6 so that the boundary field of 100 V/μ required for the deformation of the thermoplastic does not require production by a direct charge, and even lower thermoplastic charges are sufficient to produce deformation. In the exemplary embodiment illustrated in FIG. 3, the field of 100 V/μ required for the deformation is produced by a preliminary charge by means of the corona charge electrode 14.

A further increase in the sensitivity can be achieved in that an X-ray amplifier layer, known per se, is arranged, for example, between the substrate 7 and the heatable electrode 6. In this construction the thermoplastic layer 5 will be selected to be one which is provided with a photo conductor so that a double charge distribution is attained in the surface, and in fact, on the one hand, through the ionization current of the ionized inert gas and, on the other hand, by the photo electrons emitted by the photo conductor.

As the X-ray information is often of a very low frequency and the deformation efficiency of the thermoplastic is dependent upon the layer thickness at high frequencies, prior to the exposure with the X-rays it is favorable if a lattice is produced on the thermoplastic layer, for example, by the interference of two laser beams, and subsequent development of the thermoplastic film. Therefore, following the exposure with the X-rays and heating, not only is a surface relief formed as produced by the X-rays, but also a phase relief is formed, produced by the lattice structure. By multiplying the X-ray picture with a high frequency lattice structure, it is possible to improve the sensitivity and the signal-to-noise ratio of the process. The lattice structure can be removed very easily during read out by the filter 12.

Therefore, with the aid of the techniques of the present invention, X-ray pictures of particularly high contrast can be recorded and reproduced in a particularly rapid and economical fashion.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A process for recording X-ray pictures on a thermoplastic layer mounted on a transparent layer in a housing between a transparent inlet window and a transparent outlet, the housing filled with an inert gas at a pressure of at least 10 atmospheres, comprising the steps of:

creating an electric field in the area of the thermoplastic layer between the inlet window and the transparent layer;

irradiating the thermoplastic layer through the inlet window with X-rays from an X-rayed object causing ionization of the gas and movement of ions toward the thermoplastic layer, under the influence of the electric field, to produce a charge distribution on a surface of the thermosplastic layer corresponding to the object X-rays;

heating the thermoplastic layer to produce a surface relief corresponding to the charge distribution; and cooling the thermoplastic layer to fix the relief.

2. The process of claim 1, wherein the inlet window and the transparent layer are electrodes, and wherein the step of creating an electric field comprises the step of applying a voltage across the inlet window and transparent layer electrodes.

3. The process of claim 2, wherein the step of applying a voltage is further defined as applying a voltage of the order of 1 kV across the inlet window and transparent layer electrodes.

4. The process of claim 1, wherein the transparent layer is a heatable electrode, and the step of heating is further defined as applying a heating current to the heatable electrode.

5. The process of claim 1, for reproducing X-ray pictures, comprising the steps of:
irradiating the relieved thermoplastic layer with a collimated, incoherent light beam to produce a phase modulated beam:
converting the phase modulations of the beam into amplitude modulations; and
displaying the amplitude modulations on a viewing screen.

6. The process of claim 5, wherein the step of irradiating is further defined as transmitting a laser beam through the relieved thermoplastic layer.

7. The process of claim 1, comprising the step of:
forming a lattice structure on the surface of the thermoplastic layer, prior to recording, to improve the deformation efficiency of the thermoplastic layer.

8. The process of claim 7, wherein the step of forming a lattice structure is further defined as comprising the step of:
projecting a pair of interfering laser beams onto the thermoplastic layer.

9. The process of claim 1, comprising the step of:
prior to recording, establishing a uniformly distributed surface charge on the surface of the thermoplastic layer to be relieved.

10. The process of claim 9, wherein the step of establishing a uniformly distributed surface charge comprises the step of:
moving a corona charge electrode over the surface prior to recording.

11. Apparatus for recording and reproducing X-ray pictures, comprising:
a housing and recording medium in said housing which is sensitive to X-rays, said housing containing xenon at a pressure of 15 atmospheres;
an inlet window in said housing comprising a transparent electrode for receiving X-ray radiation therethrough; an outlet window in said housing, said outlet window being transparent for optical radiation;
a transparent substrate in said housing;
a heatable electrode carried on said transparent substrate;
a thermoplastic layer carried on said heatable electrode and bearing said recording medium thereon;
a mobile corona charge electrode disposed in said housing and movable over said recording medium; and
a phase contrast optical system arranged outside of said housing adjacent said outlet window.

* * * * *